Jan. 14, 1936.  W. PEYINGHAUS  2,028,008
APPARATUS FOR CONTINUOUS MACHINING OF WORK PIECES AND PARTICULARLY
IN HOUSINGS FOR AXIAL BEARINGS OF REAR VEHICLES
Filed Aug. 4, 1932  5 Sheets-Sheet 1

Inventor:

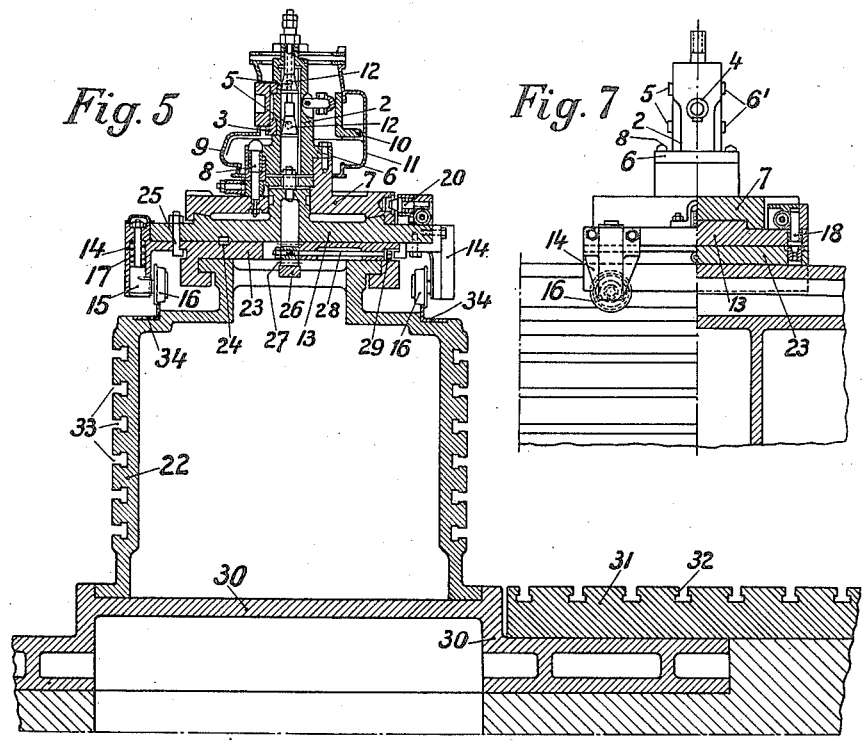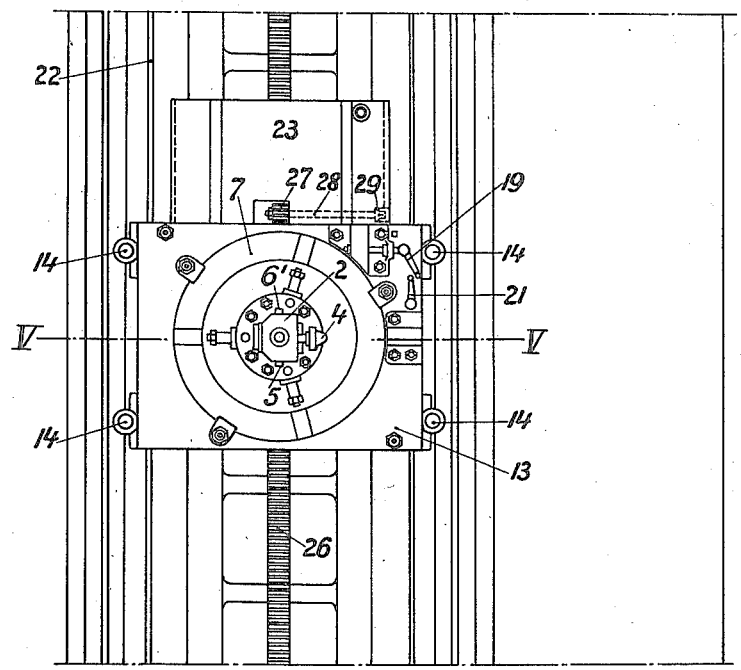

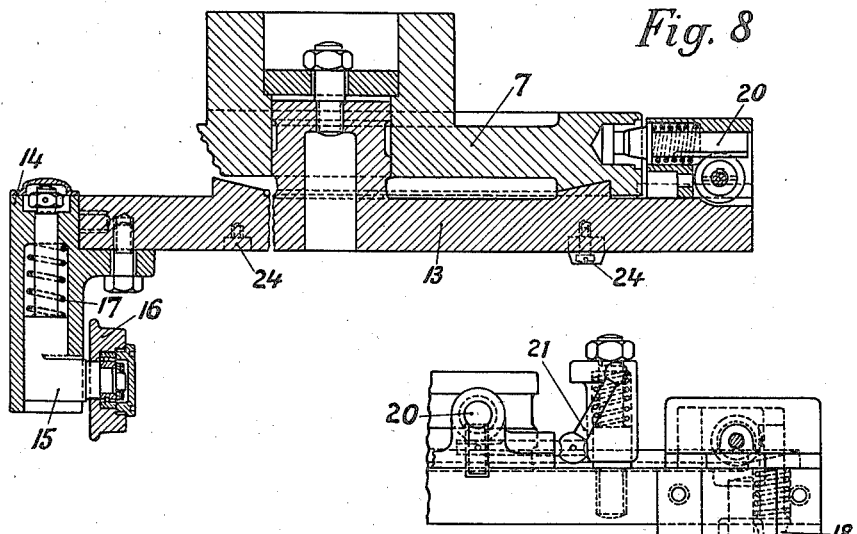
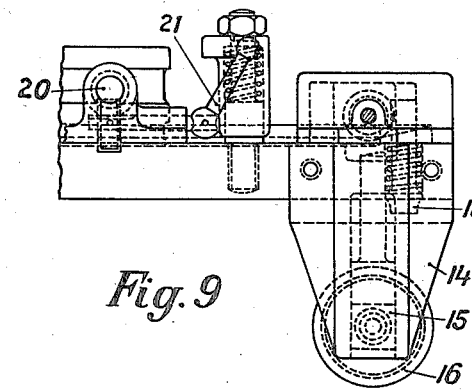
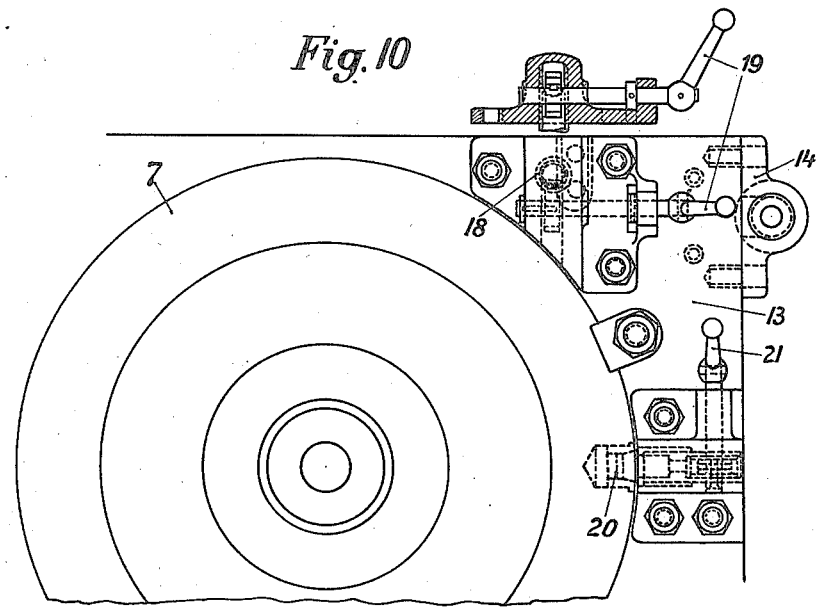

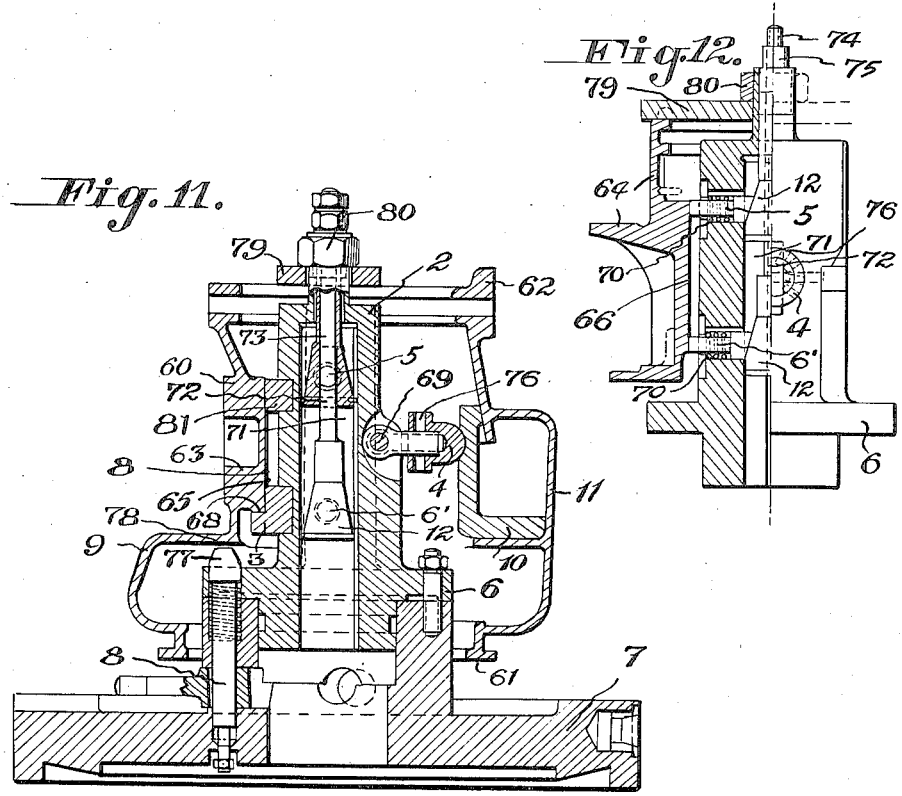

Patented Jan. 14, 1936

2,028,008

UNITED STATES PATENT OFFICE 2,028,008

APPARATUS FOR CONTINUOUS MACHINING OF WORK-PIECES AND PARTICULARLY IN HOUSINGS FOR AXIAL BEARINGS OF REAR VEHICLES

Walter Peyinghaus, Egge, near Volmarstein-on-the-Ruhr, Germany

Application August 4, 1932, Serial No. 627,476
In Germany August 19, 1931

9 Claims. (Cl. 29—33)

The present invention relates to a process (and arrangements for performing the same) for the continuous manufacture, particularly the continuous machining of axle bearing housings. Hitherto each axle bearing housing has had to be machined by itself on individual machines. As an axle bearing housing requires throughout 12–20 working operations, the existence of extraordinarily manifold devices, great losses in transport and considerable clamping operations was the result, so that the manufacture of the axle bearings became unnecessarily increased in expense. According to the present invention the continuous machining of such housings is rendered possible by a conveying member, which is displaceable on a longitudinal table, and which carries the housing and clamping device for the housing, being pushed on to clamping tables arranged on one and the same longitudinal table and being clamped to said clamping tables, whereupon the conveying member after the machining of the housing and the releasing of the clamping action without the interchanging of the housings is pushed on to the next clamping table and clamped fast.

Arrangements for performing this process are characterized above all by there being arranged for each of the external and internal machinings of the housing a separate conveying member with separate clamping device. The clamping device is suitably connected through a turn-table with the displaceable conveying member, index-pins advantageously facilitating the shifting of the turn-table into the various operative positions and automatically securing it in the operative position. The displaceable conveying member or the clamping table may also possess index-pins which facilitate the shifting of the conveying member into the particular operative positions and automatically secure both relatively to one another in the operative position. If the clamping table possesses a fine adjustment relatively to the longitudinal table, there results the possibility of giving the requisite adjustment to the clamped work when the operating machines are being set or in the case of the tools becoming worn. In front of and behind each of the two longitudinal tables for the external and internal machining of the housings there are provided contrivances for returning the displaceable conveying member after the removal of the housing, which has been machined externally, or externally and internally, and bringing it back on to the longitudinal table.

The drawings show an arrangement according to the invention by way of example.

Figs. 1 and 1a show a longitudinal section through the whole arrangement on the line I—I
Figs. 2 and 2a which represent a plan of the whole arrangement.

Figure 3:
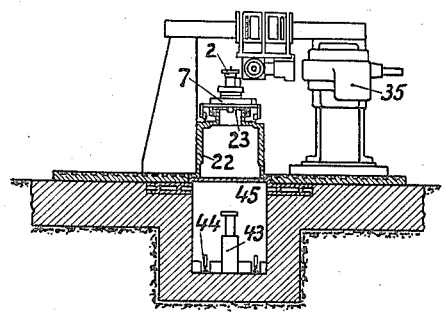
Figs. 3 and 4 show vertical cross-sections through the arrangement according to Fig. 2, on lines III—III and IV—IV of the same.
Figure 1:
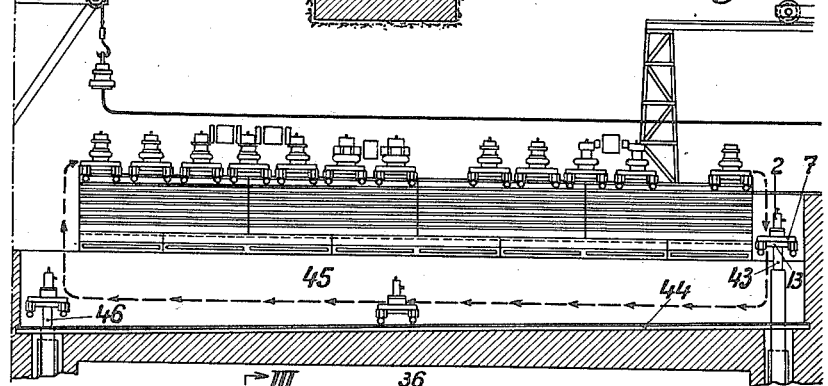
Figure 2:
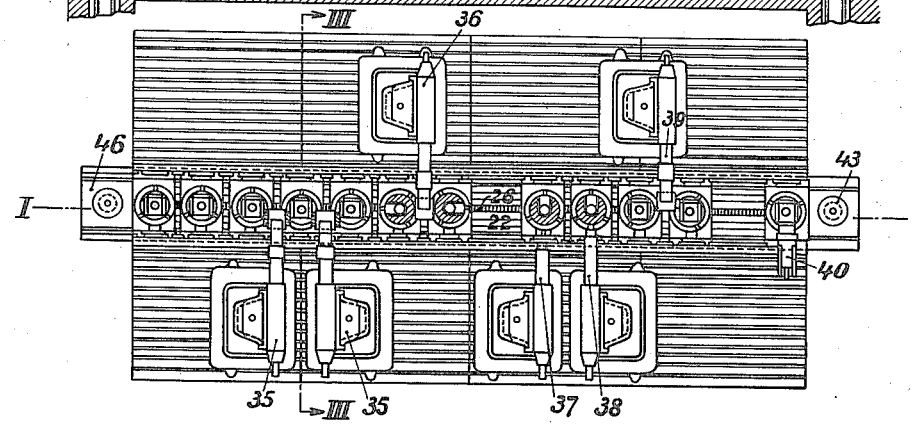
Figure 4:
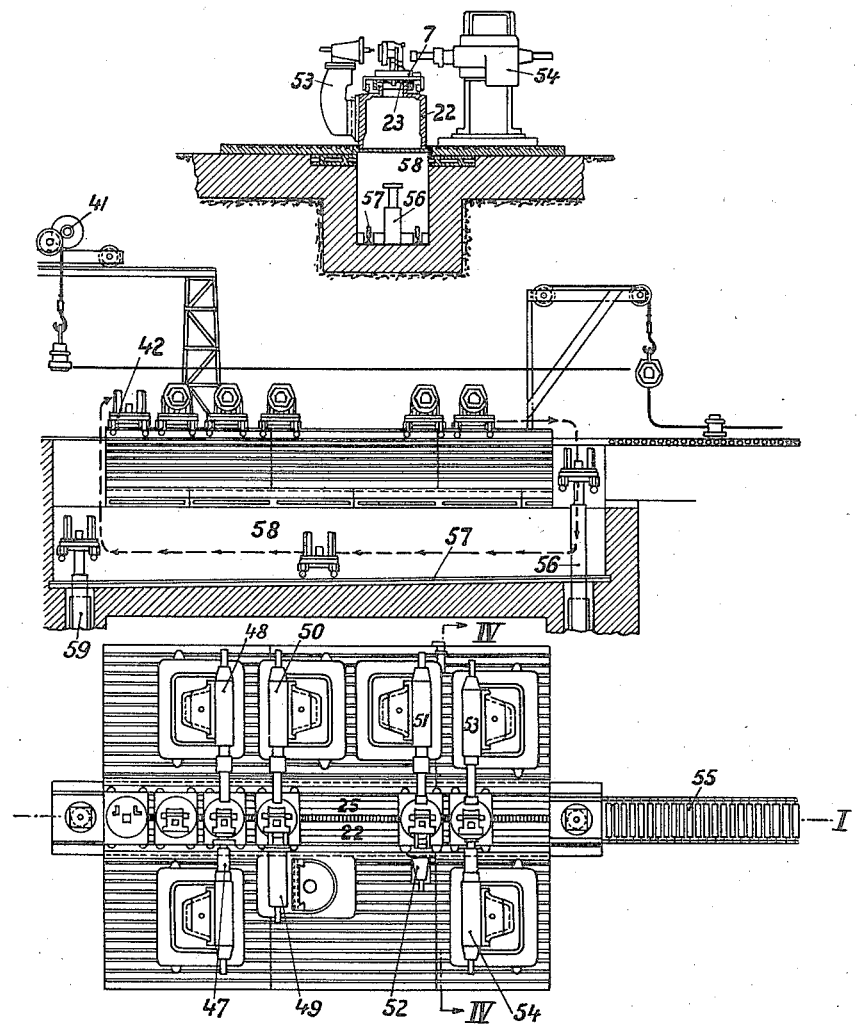

Fig. 5 shows on an enlarged scale a vertical cross-section through the longitudinal table, traveling table and clamping table, while Fig. 6 represents a corresponding plan and Fig. 7 a corresponding side elevation partly in section, Fig. 8 shows on an enlarged scale a representation of the base-plate of the travelling table, while Fig. 9 represents a corresponding side elevation Fig. 10 shows a plan of the index-pins of the base plate of the traveling table.

Fig. 11 is an enlarged vertical sectional view through the clamping table,

Fig. 12 is an enlarged side elevational view partly in section of the arrangement shown in Fig. 11, and Fig. 13 is an enlarged plan detail of the arrangement shown in Fig. 11.

Figs. 1, 1a, 2 and 2a show primarily the fundamental subdivision of the working processes for the external and internal operations. The axle-box housing on leaving the steel foundry is in the first place brought by a crane 1 into the clamping device and clamped fast by means of the latter. Figures 5 to 7 enable this clamping device to be seen more clearly. It consists essentially of a clamping mandrel 2 which passes through the hollow chamber of the axle-box housing in the axial direction thereof. The clamping mandrel 2 has an abutment surface 3 for the front surface of a saddle-shaped projection of the axle-box housing to be machined. After the axle bearing is built in the rail vehicle, the said saddle-shaped projection enters a recess between two segmental reinforcements of the bearing brass on the axle journal so that in this manner the bearing brass is secured by the saddle-shaped projection of the housing against axial displacements. Three pressure bolts 4, 5 and 6' of the mandrel (see Figure 6) hold the housing, which is slipped over the mandrel 2, in that position in which the front surface of the saddle-shaped projection of the housing comes in contact with the bearing surface 3 of the mandrel. Moreover the mandrel flange 6, by means of which the mandrel is exchangeably received in the turn-table 7, possesses supporting members 8, which are resiliently arranged and the head pieces of which rest against the still unworked face of the centrifugal chamber 9 of the housing and increase the security of the clamping action. In this centrifugal chamber moves the conveying member which conveys the lubricant from the reservoir up towards the brasses. The main action of this conveying member consists therein that it splashes the oil on the walls of the housing so that it runs down on these walls and so reaches the brasses. The pressure bolt 4 supports by means of an auxiliary clamping piece 10 inserted in the housing preferably the bottom part of the housing, while the pressure-bolts 5 and 6' are provided for clamping against the side walls of the housing. The hollow clamping mandrel contains cones 12, which on being longitudinally shifted with the aid of the threaded spindle or threaded hollow spindle carrying them press the pressure-bolts out against the action of springs which tend to draw the pressure-bolts into the mandrel. The turn-table 7, as Fig. 8 in particular shows, is revolubly mounted on a travelling table 13. This travelling-table 13 carries brackets 14, which receive angle bolts 15, on which the running wheels 16, mounted on ball-bearings, are arranged. The springs 17 serve to raise the travelling table 13 from the clamping table which is still to be described, in order that the travelling table may readily be moved on to the next clamping table. An index-pin 18 which may be arranged in the travelling table 13 and withdrawn with the aid of the lever 19, snaps automatically into a corresponding hole in the clamping table as soon as the travelling table has come into a position relatively to the clamping table which corresponds to the working position. In addition to the index-pin 18 for determining the positions of the travelling table in relation to the clamping table there is also provided a special index-pin 20 for fixing the positions of the turn-table 7 in relation to the travelling-table 13. This index-pin 20 also springs in automatically as soon as the turn-table 7 and together with it the clamping device of Fig. 5, that is, of the housing, has reached the position which is necessary for the operation to be performed by the machine-tool now to be employed. In principle therefore it is not the work which is set in position, but machines for carrying out the operations are selected which transmit their feed-motion and working-motion to the tool, whereas the work itself is at rest.

The actuation of the index-pin 20 is effected by means of the lever 21.

After the rough cast-steel housing, which has been delivered by the crane 1 on to the travelling-table 13 provided with the turn-table 7, has been clamped in the manner just elucidated, the travelling table 13, as a conveying device displaceable on the longitudinal tables 22, is driven on to the clamping tables 23 arranged on one and the same longitudinal table 22 of each machining machine and clamped fast thereto. As soon as the travelling table 13 has occupied the necessary position relatively to the operating machine or to the clamping table 23 set correctly from the start, the index-pin 19 springs automatically into a recess suitably provided in the clamping table and automatically fixes, relatively to one another, both tables in the operating position. (See Fig. 7.) On the ends between the travelling table 13 and the clamping table 23 there are arranged conical springs 24 which on the attachment screws 25 being tightened take up their position and guarantee a proper arresting action. The attachment screws 25 which are provided to relieve the index-pin 18, which cannot alone take up the transverse forces exerted during the operation, may be replaced by attachment devices operative pneumatically, hydraulically or electromagnetically. In order that the clamping table 23 may be suitably adjusted on the operating machines being set or in the case of the wear of the tools, there is provided a fine adjustment with the aid of rack 26 in the longitudinal table 22 and pinion 27, shaft 28 and square portion 29 in the clamping table 23.

The longitudinal tables 22 have, as Fig. 5 shows, such a form of base-plate 30 that on both sides of the longitudinal table bed-plates 31 with clamp grooves 32 can be applied. The requisite operating machines may, consequently be clamped directly with the bed-plates 31. The lateral surfaces of the longitudinal tables 22 are likewise provided with clamp grooves at 33, which are able to receive directly the lighter operating machines, supporting blocks, holders, grinding machines and so on. The longitudinal tables carry on their upper surface the rails 34 on which roll the wheels 16 of the travelling table 13.

The travelling table 13 which has received the cast steel housing delivered by the crane 1, said housing being supported on said table through its turn-table 7 and its mandrel 2, is now guided to the clamping table 23 which is co-ordinated to the first operating machine and clamped with it in the manner stated. The first operating machine consists of two milling machines 35 which mill the guideways into the axle box housing. It is this machining process which Fig. 3 shows in side elevation. After the travelling table 13, after the machining of the axle box housing in the milling machines 35, has been withdrawn from the clamping table co-ordinated to these, it is driven to the clamping table which is co-ordinated to the milling machine 36 for milling the spring collar surface. As soon as the index pin 18 has snapped in, the screws 25 are tightened and after releasing the index pin 20 and displacing the turn-table 7 into the operative position now requisite the machining is commenced. These processes are repeated as desired in the case of the boring machines 37 and 38 for the preliminary boring for completing the boring of the spring collar hole, in the case of the milling machine 39 for milling the dust-pocket surface and in the case of the three spindle boring machine 40 for boring the dust pocket holes. As this boring machine is very light in consequence of the small holes, it is mounted in the clamp grooves 33 in a lateral cheek of the longitudinal table 22.

After the external machining of the axle box housing has been finished in this manner, the axle box, which may weigh up to 150 kg. is withdrawn by the crane 41 from the clamping device after being unclamped and is inserted on the travelling table 42 of simple construction for the undertaking of the internal machining. This travelling table 42 can be constructed more simply because there are now present surfaces which have already been machined and which are at disposal as abutment surfaces. The travelling table 13 with turn-table 7 and mandrel 2, whose housing was finished externally and was removed by the crane 41, arrives at the elevating device 43, which sinks automatically after receiving the travelling table and delivers the travelling table to the inclined return track 44 which is arranged in the tunnel 45 below the longitudinal table. The travelling table passes on to the elevating device 46 by which it is raised automatically and set down again at the beginning of the longitudinal table 22.

The housing which has been set down on the travelling table 42 is now machined internally. It is now clamped resting on the spring shoulder face. It first arrives with its travelling table at the clamping table co-ordinated with the lathe 47. The lathe possesses a knife-head for the machining of the cover face. At the same time the milling machine 48 produces the brass seating. Hereupon there is performed in a six-spindle boring machine 49 the production of the casing holes, while the milling machine 50 mills the lateral surfaces. Hereupon the milling machine 51 produces the catch brass grooves while the boring machine 52 bores the catch brass holes. The milling machines 53 and 54 finally mill in the exact length of the brass seating. After leaving these operating machines the machining of the housing is finished and the housing is delivered to the roller track 55 for the continuous assembling operations. An elevating device 56 carries the travelling table on to the inclined return track to the elevating device 59, which track is arranged in the tunnel 58, said device 59 delivering it again automatically to the point of the longitudinal table 22 in question and setting it on the latter.

An axle-box to be machined is indicated in Figure 11. 60 indicates the spring collar surface to be machined externally, 61 the cover surface, 62 the dust-pocket surface, 63 the hole of the spring collar and 64 the guide surfaces (see Figure 12). In addition to the above surfaces to be machined externally, the following surfaces are to be machined internally, namely the brass seating surface 65, the brass lateral surfaces 66, the cover holes (not shown), the catch brass surfaces (not shown) and the front surface 68 of the brass seating. Now according to the invention, the clamping mandrel 2, which passes through the hollow chamber of the housing in an axial direction and is interchangeably mounted over its flange 6 against the rotatable base-plate supporting the mandrel, is provided with abutments 80 and 3 for the front surface 67 and for the front surface 68 of the brass seating while pressure bolts which are effective in at least two directions are adapted to clamp the housing. One of these pressure bolts is designed as a spherical nut 4 and is hinged to the mandrel 2 at 69. In addition to the said pressure bolt, two further pressure bolts are provided which are adapted to clamp in the direction vertically to the direction of the pressure bolt 4 and 69. These pressure bolts which are arranged at two different levels or heights are designated 5 and 6'. They are under the influence of springs 70 on the one hand whereby they are automatically returned toward the hollow chamber 71 of the mandrel and on the other hand, they are under the influence of the cones 12 against which they bear with correspondingly shaped pressure surfaces. These cones are adapted to move longitudinally from the outside over the spindle 72 and hollow spindle 73, the spindles 74 and 75 being designed as threaded spindles. Consequently, by twisting the spindle heads 74 and 75, the pressure bolts 5 and 6' are driven out and forced against the brass seating surfaces 66. However, the spherical nut 4 can be clamped externally by inserting a mandrel in the holes 76 and by turning the nut against the auxiliary clamping member 10 which is supported against the base part 11 of the axle-box housing.

Before the pressure bolts 5 and 6' and the spherical nuts 4 are brought into the final clamping position, the strap 79 bearing against the front wall of the housing is tightened over the clamping nut 80 so that the housing is secured in a vertical direction by the housing surface 68 bearing against the abutment 3 and the front surface on the enlarged part side bearing against the strap 79. The yielding bolts 8 with their head pieces 77 press tightly against the grooved part of the centrifugal chamber 9. If the previously loosened fastening means 67 are tightened, the head pieces 77 bear firmly against the centrifugal chamber 9 so that they form further supporting points of the housing and strengthen the clamping.

It is obvious from the drawings that the mandrel 2 is interchangeable by means of the flange 6 against the base-plate which supports the mandrel. There are also interchangeable the abutments 80 and 3, the pressure bolts 5, 6' with the cones 12 and also the spherical nuts 4, 69 with the auxiliary clamping members 10 so that the clamping device can be adapted to any design of axle box.

It is a feature of the essence of the invention that the manner, on which machines and how the operation has been performed, is completely irrelevant. The process according to the invention can be applied in the case of any multiple-stage operation.

What I claim is:—

1. Apparatus for the continuous machining of work pieces, in particular the housings for axle bearings of rail vehicles, comprising in combination working machines for the faces of the work piece to be treated, a main table, said working machines arranged behind each other along the said main table, a travelling table on said main table according to the work pieces to be treated simultaneously at a working station, operative means between main table and travelling table for facilitating the travel of the travelling table on the main table, clamping devices for the work pieces on the said travelling table adapted for the faces of the work pieces to be treated by the working machines, each working station having a clamping table on said longitudinal table, said clamping tables being designed in the form of a support for machine tools and adjustably arranged to move only under sliding friction, said clamping tables adapted for receiving the travelling tables at the working stations, means for rigidly securing together the travelling and clamping tables at the working stations.

2. Apparatus in accordance with claim 1, comprising separate travelling tables for the internal and the external machining of the workpiece and separate main tables therefor.

3. Apparatus in accordance with claim 1, comprising a turn table across which the clamping device is connected to the travelling table.

4. Apparatus in accordance with claim 1, comprising a turn table across which the clamping device is connected to the travelling table, and index-pins for facilitating the displacement of the turn table into the individual machining positions and automatically fixing the turn table in definite working stations.

5. Apparatus in accordance with claim 1, comprising index-pins between the travelling table and the clamping table which facilitate the displacement of the travelling table in the individual working stations.

6. Apparatus in accordance with claim 1, comprising clamping members between the travelling table and the clamping table to fix the travelling table in the desired working station.

7. Apparatus in accordance with claim 1, comprising fine adjusting devices between the clamping table and the main table.

8. Apparatus in accordance with claim 1, comprising in front and in the rear of the main tables for the external and internal treatment of the work piece devices for the automatic return of the travelling table after removal of externally or internally machined work pieces and for return placement on the main table.

9. Apparatus according to claim 1, wherein the means for facilitating travel of the travelling table on the main table are in the form of rolling bodies.

WALTER PEYINGHAUS.